United States Patent
Gwidt et al.

(10) Patent No.: US 11,852,089 B1
(45) Date of Patent: Dec. 26, 2023

(54) SYSTEMS AND METHODS FOR IMPROVED CATALYTIC CONVERTER PERFORMANCE DURING COLD STARTS

(71) Applicant: GM GLOBAL TECHNOLOGY OPERATIONS LLC, Detroit, MI (US)

(72) Inventors: J. Michael Gwidt, Brighton, MI (US); Matthew Pruski, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/305,065

(22) Filed: Apr. 21, 2023

(51) Int. Cl.
F02D 41/02 (2006.01)
F16H 45/00 (2006.01)

(52) U.S. Cl.
CPC ......... *F02D 41/0255* (2013.01); *F16H 45/00* (2013.01); *F16H 2045/005* (2013.01)

(58) Field of Classification Search
CPC .......... F02D 41/0255; F02D 2041/026; B60W 30/194
See application file for complete search history.

(56) References Cited

U.S. PATENT DOCUMENTS

| | | | | |
|---|---|---|---|---|
| 5,329,830 | A * | 7/1994 | Kitagawa | F16H 61/08 475/120 |
| 7,370,470 | B2 * | 5/2008 | Graupner | F02D 41/0255 123/681 |
| 7,771,311 | B2 * | 8/2010 | Graham | B60W 30/194 477/98 |
| 8,277,363 | B2 * | 10/2012 | Lahti | B60W 50/087 477/100 |
| 8,424,293 | B2 * | 4/2013 | Marlett | F02D 41/029 477/110 |
| 2008/0202095 | A1 * | 8/2008 | Granqvist | B60W 30/192 60/274 |

* cited by examiner

*Primary Examiner* — Sherry L Estremsky
(74) *Attorney, Agent, or Firm* — Lorenz & Kopf LLP (57) ABSTRACT

An engine consumes fuel and air to generate an exhaust gas stream. An exhaust system channels the exhaust gas stream from the engine to a tailpipe. An aftertreatment system is included in the exhaust system and includes a catalyst. A transmission system is coupled with the engine. The transmission system includes a transmission and a torque converter coupled with the transmission through a shaft. A lock is included in the transmission system to selectively prevent rotation of the shaft to increase a load on the engine by the torque converter.

20 Claims, 4 Drawing Sheets

SYSTEMS AND METHODS FOR IMPROVED CATALYTIC CONVERTER PERFORMANCE DURING COLD STARTS

INTRODUCTION

The present disclosure relates to engine systems and methods and to the exhaust systems thereof, and more particularly relates to engine systems and methods that employ a transmission system lock to reduce catalytic converter light-off time.

Internal combustion engines convert fuel and air to various compounds while extracting energy to perform intended functions, such as propelling a vehicle. The compounds generated in engines may be further converted or treated by various aftertreatment systems. For example, a two-way catalytic converter converts hydrocarbon (HC) and carbon monoxide (CO) to innocuous elements or compounds. Also for example, a three-way catalytic converter is designed for converting HC, CO and nitrogen oxides.

Characteristics of the exhaust leaving the engine is subject to numerous variables and ensuring optimal aftertreatment is challenging. The challenges are compounded by limitations in the aftertreatment systems such as those that relate to the performance level of catalysts at various temperatures. For example, at cool/cold temperatures, the catalyst has a reduced ability to convert the target compounds. As temperature increases, the reaction rate of the catalytic converter increases gradually. A particular catalytic converter has a threshold temperature, which may be referred to as the light-off temperature, where the catalyst effectively starts the chemical reactions that convert exhaust gas constituents. At the light-off temperature, the reaction rate increases dramatically and temperatures in the converter increase significantly. At and above the light-off temperature threshold, the catalytic converter reaches an effective reaction rate where the resulting emission levels reach a preferred range.

Accordingly, it is desirable to provide engine systems that have exhaust aftertreatment systems with a low time to light-off. Furthermore, other desirable features and characteristics of the present disclosure will become apparent from the subsequent detailed description and the appended claims, taken in conjunction with the accompanying drawings and the foregoing introduction.

SUMMARY

Engine systems and methods increase the rate of heating of an exhaust system's catalyst. In a number of embodiments, an engine consumes fuel and air to generate an exhaust gas stream. An exhaust system channels the exhaust gas stream from the engine to a tailpipe. An aftertreatment system is included in the exhaust system and includes a catalyst. A transmission system is coupled with the engine. The transmission system includes a transmission and a torque converter coupled with the transmission through a torque transfer element such as a shaft. A lock is included in the transmission system to selectively prevent rotation of the torque transfer element to increase a load on the engine by the torque converter.

In additional embodiments, a controller determines whether the transmission is in a park state or a neutral state. The controller enables the lock only when the transmission is in one of the park state or the neutral state.

In additional embodiments, the controller determines whether the aftertreatment system is below a threshold temperature. The controller operate the lock to prevent rotation of at least one element of the transmission system when the aftertreatment system is below the threshold temperature.

In additional embodiments, the engine includes an ignition system. The controller determines whether the aftertreatment system is below a threshold temperature. The controller operates the lock to prevent rotation of at least one element of the transmission system when the aftertreatment system is below the threshold temperature. The controller delays the timing of the ignition system after the lock is operated to increase the rate of heating of the aftertreatment system.

In additional embodiments, the controller wakes up in response to a signal from a sensor. The controller operates the lock following start of the engine.

In additional embodiments, the controller operates the lock to prevent rotation of an element of the transmission system when the aftertreatment system is below a threshold temperature. The controller operates the lock to allow rotation of the element when the transmission is shifted so as to not be in park or neutral, including when the aftertreatment system is below the threshold temperature.

In additional embodiments, the transmission system includes a case. The torque converter includes an impeller coupled with the engine and a turbine coupled with the transmission through a shaft. The lock includes a clutch of the transmission system and operates to ground the shaft to the case.

In additional embodiments, the controller, based on a temperature of the aftertreatment system, controls operation of the lock to selectively increase the load on the engine from the torque converter.

In additional embodiments, the controller controls both the lock and operational parameters of the engine to selectively increase the rate of heating of the catalyst of the aftertreatment system during a cold start.

In additional embodiments, the controller determines whether a temperature of the catalyst is below a threshold temperature and whether the transmission is in a park state or a neutral state. The controller operates the lock to lock the transmission system when the catalyst is below the threshold temperature and the transmission is in one of the park state or the neutral state. The controller determines whether the catalyst has exceeded the threshold temperature and whether the transmission is shifted from the park state or the neutral state. The controller operates the lock to unlock the transmission system when either the catalyst has exceeded the threshold temperature, or the transmission is shifted from the park state or the neutral state.

In a number of other embodiments, a method of operating an engine system includes operating an engine that consumes fuel and air to generate an exhaust gas stream. The exhaust gas stream is channeled through an exhaust system from the engine to a tailpipe. An aftertreatment system is positioned in the exhaust system and includes a catalyst. A transmission system is coupled with the engine and includes a transmission. A torque converter is coupled with the transmission through a torque transfer element. A lock in the transmission system selectively prevents rotation of the torque transfer element to increase a load on the engine.

In additional embodiments, a controller determines whether the transmission is in one of a park state or a neutral state. The controller enables the lock only when the transmission is in one of the park state or the neutral state.

In additional embodiments, the controller determines whether the aftertreatment system is below a threshold temperature. The lock is operated by the controller to prevent rotation of an element of the transmission system when the aftertreatment system is below the threshold temperature.

In additional embodiments, the controller determines whether the aftertreatment system is below a threshold temperature. The controller operates the lock to prevent rotation of the element of the transmission system when the aftertreatment system is below the threshold temperature. The controller additionally delays the timing of an ignition system of the engine after the lock is operated to increase a rate of heating of the aftertreatment system.

In additional embodiments, the controller wakes in response to a signal from a sensor.

In additional embodiments, the controller operates the lock to prevent rotation of an element of the transmission system when the aftertreatment system is below a threshold temperature. The controller operates the lock to allow rotation of the element when the transmission is shifted so as to not be in park or neutral, including when the aftertreatment system is below the threshold temperature.

In additional embodiments, the transmission system includes a case. An impeller of the torque converter is coupled with the engine. A turbine of the torque converter is coupled with the transmission through a shaft. The shaft is selectively grounded to the case by a clutch of the transmission system as the lock.

In additional embodiments, the controller, based on a temperature of the aftertreatment system, controls operation of the lock to selectively increase the load on the engine from the torque converter.

In additional embodiments, the controller controls both the lock and operational parameters of the engine to selectively increase the rate of heating of the catalyst of the aftertreatment system during a cold start.

In a number of additional embodiments, a vehicle includes an engine system with an engine that consumes fuel and air to generate an exhaust gas stream. An exhaust system channels the exhaust gas stream from the engine to a tailpipe. An aftertreatment system in the exhaust system includes a catalyst. A transmission system is coupled with the engine. The transmission system includes a transmission and a torque converter coupled with the transmission through a shaft. A lock in the transmission system operates to selectively prevent rotation of the shaft to increase a load on the engine by the torque converter. A controller determines whether a temperature of the catalyst is below a threshold temperature and determines whether the transmission is in a park state or a neutral state. The controller operates the lock to lock the transmission system when the catalyst is below the threshold temperature and the transmission is in one of the park state or the neutral state. The controller determines whether the catalyst has exceeded the threshold temperature and whether the transmission is shifted from the park state or the neutral state. The controller operates the lock to unlock the transmission system when either the catalyst has exceeded the threshold temperature, or the transmission is shifted from the park state or the neutral state.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
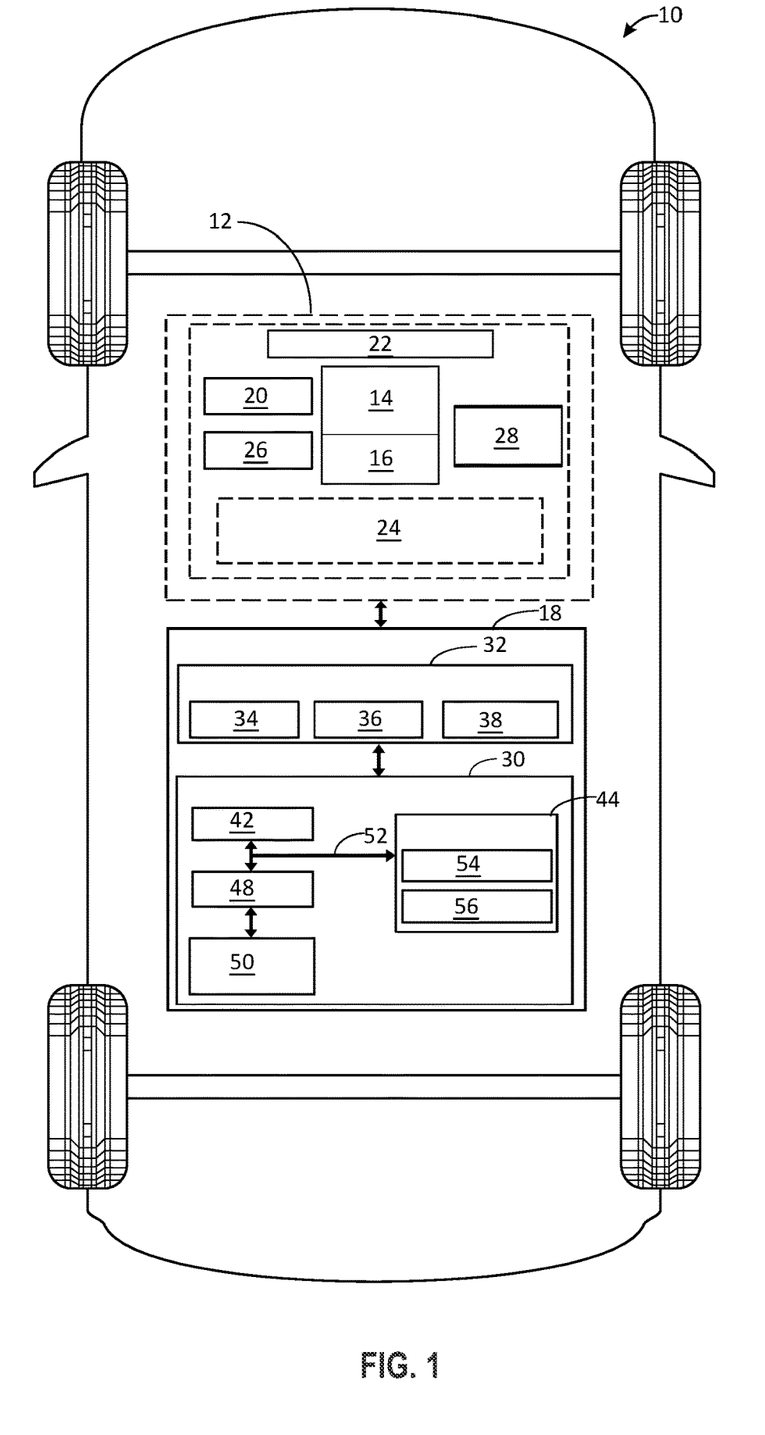
FIG. 1 is a functional diagram of a vehicle that includes a powertrain system with a cold start system with transmission lock, in accordance with an exemplary embodiment.

Referring to FIG. 1, illustrated is a vehicle 10, having a powertrain system 12 according to an exemplary embodiment. In various embodiments, the powertrain system 12 includes an engine 14 using internal combustion and controlled to optimize fuel economy and emissions based on the requested load. The requested load may be based on a driver request or on an autonomous input for torque and/or speed. To deliver the requested torque and/or speed, a transmission 16 is coupled with the engine 14. The transmission 16 may operate to provide forward operation of the vehicle 10, reverse operation of the vehicle 10, and a number of speed ratios for the output from the engine 14 where power may be transferred to the wheels of the vehicle 10. The transmission 16 may also be selectively placed in a park state and in a neutral state where power is not delivered to the wheels of the vehicle 10.

In certain embodiments, the vehicle 10 comprises an automobile. As will be appreciated, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a truck, a watercraft, an aircraft, and/or one or more other types of vehicles. In addition, in various embodiments, it will also be appreciated that the vehicle 10 may comprise any number of other types of mobile platforms with an engine system such as the powertrain system 12.

In the depicted embodiment, the vehicle 10 includes a body that substantially encloses other components of the vehicle 10. Also in the depicted embodiment, the vehicle 10 includes a plurality of axles and wheels. The wheels are each rotationally coupled to one or more of the axles near a respective corner of the body to facilitate movement of the vehicle 10. In one embodiment, the vehicle 10 includes four wheels, although this may vary in other embodiments (for example for trucks and certain other vehicles).

The vehicle 10 further includes a control system 18 associated with the powertrain system 12 and with other systems of the vehicle 10. The powertrain system 12 may drive the vehicle wheels to rotate in a forward direction or a reverse direction. The powertrain system 12 generally includes a number of components and subsystems including the engine 14, the transmission 16, an ignition system 20, an intake system 22, an exhaust system 24, a fuel system 26, and a valve system 28. In various embodiments, the powertrain system 12 is a four stroke internal combustion engine in which a piston in each cylinder completes an intake stroke, a compression stroke, a combustion stroke, and an exhaust stroke to drive the engine 14. Any number of cylinders may be included in the engine 14. The intake system 22 delivers air and controls the air's mass flow rate to the cylinders, such as via a throttle. The fuel system 26 delivers fuel to the cylinders and controls its timing and amount via a number of injectors as further described below. The valve system 28 includes a number of valves to control the flow of air/gases into and out of the cylinders, and the valves may have variable timing. The ignition system 20 is operated to control the timing of, and initiate, combustion in the cylinders. The exhaust system 24 conveys combustion gases from the engine 14 to the atmosphere and may include aftertreatment devices.

In various embodiments, the control system 18 provides instructions for controlling various aspects of the vehicle 10 including for controlling the powertrain system 12. In various embodiments, the control system 18 comprises an engine control unit (ECU) for the engine 14. Also in various embodiments, among other functionality, the control system 18 selectively controls operation of the engine system 12 to achieve optimized fuel economy and minimized emissions while achieving desired torque and speed outputs. In various embodiments, the control system 18 provides these functions in accordance with the steps of the method 200 described further below in connection with the FIG. 4.

As depicted in FIG. 1, in various embodiments, the control system 18 includes a controller 30 and a sensor array 32. In various embodiments, the sensor array 32 includes sensors for measuring observable conditions, including of the powertrain system 12, and generating sensor data based thereon. As depicted in FIG. 1, in various embodiments, the sensor array 32 includes one or more engine sensors 34. In various embodiments, the engine sensors 34 are attached to, disposed within, or otherwise disposed in proximity to the powertrain system 12 such that various temperatures, positions, speeds, and other observable parameters are measured. The sensor array 32 includes one or more exhaust system sensors 36. In various embodiments, the exhaust system sensors 36 are attached to, disposed within, or otherwise disposed in proximity to the exhaust system 24 such that various temperatures, concentrations, and other observable parameters are measured. In certain embodiments, the sensor array 32 may also include one or more other sensors 38, for example for operation of the engine 14 and/or of other systems and devices of the vehicle 10. For example, in certain embodiments, the other sensors 38 may include one or more ignition sensors for detecting when the engine 14 is turned on and/or running, one or more torque request sensors, such as a throttle position sensor, for detecting load requests of the engine 14, and other sensors as desired.

In various embodiments, the controller 30 is coupled with the sensor array 32 and provides instructions for controlling the powertrain system 12 and the exhaust system 24 via commands based on the sensor data. As depicted in FIG. 1, the controller 30 comprises a computer system. In certain embodiments, the controller 30 may also include the sensor array 32 and/or one or more other vehicle components. In addition, it will be appreciated that the controller 30 may differ from the embodiment depicted in FIG. 1. For example, the controller 30 may be coupled with or may otherwise utilize one or more remote computer systems and/or other control systems, for example as part of one or more of the above-identified vehicle devices and systems.

In the depicted embodiment, the computer system of the controller 30 includes a processor 42, a memory 44, an interface 48, a storage device 50, and a bus 52. The processor 42 performs the computation and control functions of the controller 30 and may comprise any type of processor or multiple processors, single integrated circuits such as a microprocessor, or any suitable number of integrated circuit devices and/or circuit boards working in cooperation to accomplish the functions of a processing unit. During operation, the processor 42 executes one or more programs 54 contained within the memory 44 and, as such, controls the general operation of the controller 30 and the computer system of the controller 30, generally in executing the processes described herein, such as the method 200 discussed further below in connection with FIG. 4.

The memory 44 may be any type of suitable memory. For example, the memory 44 may include various types of dynamic random access memory (DRAM) such as SDRAM, the various types of static RAM (SRAM), and the various types of non-volatile memory (PROM, EPROM, and flash). In certain examples, the memory 44 may be located on and/or co-located on the same computer chip as the processor 42. In the depicted embodiment, the memory 44 stores the above-referenced programs 54 along with stored values 56 (e.g., including, in various embodiments, predetermined threshold values for controlling emissions).

The bus 52 serves to transmit programs, data, status and other information or signals between the various components of the computer system of the controller 30. The interface 48 allows communications with the computer system of the controller 30, such as from a system driver and/or another computer system and is implemented using any suitable method and apparatus. In one embodiment, the interface 48 obtains the various data from the sensor array 32, the powertrain system 12, the exhaust system 24, and/or one or more other components and/or systems of the vehicle 10. The interface 48 may include one or more network interfaces to communicate with other systems or components. The interface 48 may also include one or more network interfaces to communicate with technicians, and/or one or more storage interfaces to connect to storage apparatuses, such as the storage device 50.

The storage device 50 may be any suitable type of storage apparatus, including various different types of direct access storage and/or other memory devices. In one exemplary embodiment, the storage device 50 comprises a program product from which the memory 44 receives the programs 54 that execute one or more embodiments of one or more processes of the present disclosure, such as the steps of the method 200 discussed further below in connection with FIG. 4. In another exemplary embodiment, the program product may be directly stored in and/or otherwise accessed by the memory 44 and/or the storage device 50 and/or other memory devices.

The bus 52 may be any suitable physical or logical means of connecting computer systems and components. This includes, but is not limited to, direct hard-wired connections, fiber optics, infrared, and wireless bus technologies. During operation, the programs 54 are stored in the memory 44 and are executed by the processor 42.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 42) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 30 may also otherwise differ from the embodiment depicted in FIG. 1, for example in that the computer system of the controller 30 may be coupled to or may otherwise utilize one or more remote computer systems and/or other control systems.

Figure 2:
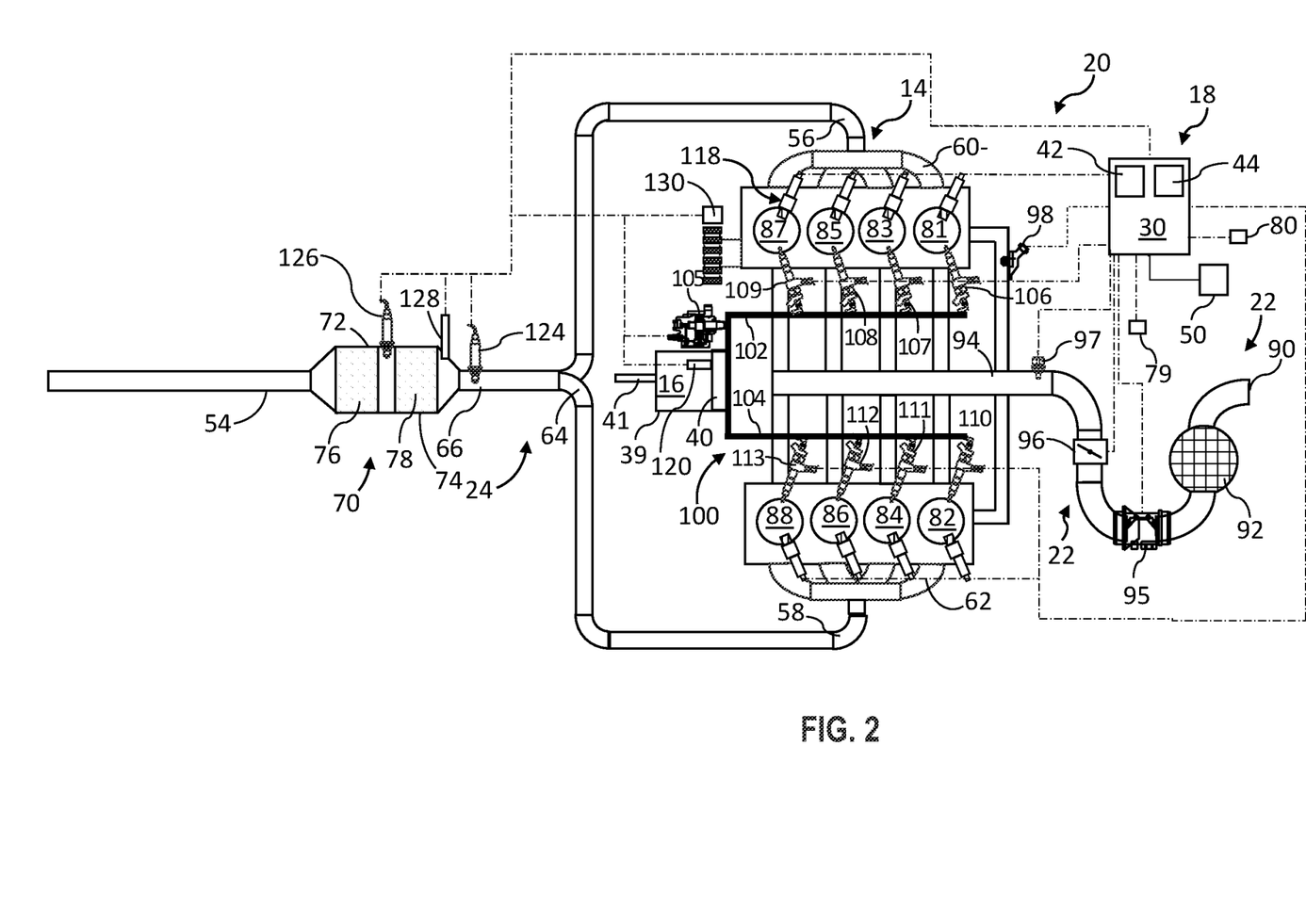
FIG. 2 is a schematic illustration of the powertrain system of the vehicle of FIG. 1 having the cold start system with transmission lock, in accordance with various embodiments.

Referring to FIG. 2, the powertrain system 12 includes the engine 14, which in the present embodiment is an eight cylinder gasoline and air consuming internal combustion engine. In other embodiments, the engine 14 may have a different number of cylinders. The engine 14 may be naturally aspirated as illustrated, or in other embodiments may include a turbocharger or supercharger to pump air into the engine for combustion purposes. The powertrain system 12 also includes the transmission 16, which is contained in a case 39 and is coupled with the engine 14 through a torque converter 40. The torque converter 40 may be a hydraulic torque converter with an impeller coupled with the engine 14 that fluidly drives a turbine coupled with the transmission 16 as further described below. The turbine extracts energy from fluid pumped by the impeller to drive the transmission 16 and therethrough a driveshaft 41 coupled with one or more of the wheels of the vehicle 10.

The powertrain system 12 includes or is associated with the exhaust system 24 for conveying exhaust gases from the combustion chambers of the engine 14 to a tailpipe 55 for discharge to the atmosphere. A pair of pipe sections 57, 58 run from the engine 14, such as from its exhaust manifolds 60, 62 respectively, in a dual arrangement and through a junction 64 and a common pipe section 66 to an aftertreatment system including an aftertreatment device 70, which in this embodiment includes a two element arrangement with catalytic converters 72 and 74. In other embodiments, a different number of catalytic converters/elements may be included. The catalytic converters may be two-way or three-way type. The catalytic converters 72, 74, when configured as a two-way type, converts two components in the exhaust gas stream, including CO and HC, to other constituents. When the catalytic converters 72, 74 are configured as a three-way type, they convert three components in the gas stream to other elements or compounds including converting CO, HC and nitrogen oxides to innocuous elements or compounds. The catalytic converters 72, 74 may contain catalysts 76, 78 such as platinum, palladium or other materials. The rates at which the catalysts 76, 78 assist in the conversion of exhaust gases may vary relative to temperature, for example at cold/cool temperatures the conversion rates may decline significantly.

The powertrain system 12 is spark ignition operated and as such, includes the ignition system 20 with individual spark plugs 118 in each of the cylinders 81-88. The ignition system 20 also includes a sensor 80, such as may be operated by a key, an interface, or a remote transmitter. The sensor 80 may be coupled with the controller 30 to initiate operation of the vehicle 10.

The powertrain system 12 includes the intake system 22 with an air inlet 90, an air filter 92 and an intake manifold 94. The intake manifold 94 supplies air to the cylinders 81-88 of the engine 14 as controlled by intake valves (not illustrated). The exhaust system 24 conveys, as controlled by exhaust valves (not illustrated), combusted gases from the cylinders 81-88 to atmosphere through the tailpipe 55. Disposed in the intake system 22 downstream from the air filter 92 and upstream from the intake manifold are, in order, a mass air flow sensor 95, an intake throttle 96, and an intake manifold pressure sensor 97. The engine 14 is liquid cooled and includes a coolant temperature sensor 98 to provide data on the operating temperature of the engine. As used herein, upstream and downstream means the relative location of something in the flow of air/gases through the powertrain system 12 from the air inlet 90 to the tailpipe 55. For example, the air inlet 90 is upstream from the air filter 92 and the catalytic converter 74 is downstream from the junction 64.

The powertrain system 12 includes the fuel system 26 for supplying fuel to the cylinders 81-88. In the current embodiment, the engine is a gasoline-direct-injection engine with fuel rails 102, 104 supplying fuel from a fuel pump 105 to injectors 106-113. The powertrain system 12 also includes the control system 18 that generally includes the controller 30 coupled with the various actuators and sensors.

The controller 30 may receive various signals from the sensor array 32 and send control signals to various actuators for operation of the powertrain system 12 and its related systems. In the current embodiment, the sensor array 32 includes the exhaust system sensors 36, which may include oxygen sensors 124 and 126, and an exhaust gas temperature sensor 128, such as upstream from the aftertreatment device 70. The position of the exhaust gas temperature sensor 128 is selected to measure the temperature of the exhaust gas entering the catalytic converter 74. In other embodiments, the exhaust gas temperature sensor 128 may be located downstream from the aftertreatment device 70, or at another location in the exhaust system 24. In further embodiments, two exhaust gas temperature sensors 128 may be included, with one upstream from the aftertreatment device 70 and the other downstream from the aftertreatment device 70. The oxygen sensors 124, 126 measure the oxygen content of the exhaust gases leaving the engine 14/before the aftertreatment device 70 and after the catalytic converter 74/before the catalytic converter 72. The oxygen sensors 124, 126 provide data to determine the amount of remaining CO in the gas stream at their locations in the exhaust system 24. The oxygen sensors 124, 126 may be exhaust/oxygen/wide range air-fuel (WRAF) sensors. The signals from the oxygen sensors 124, 126 vary according to changing oxygen levels in the exhaust and enable determining unburned oxygen in the exhaust indicative of CO content. The signals from the oxygen sensors 124, 126 may also be used to determine the fuel/air ratio and other parameters at which the engine 14 is operated by the controller 30.

The sensor array 32 includes the engine sensors 34, which include engine system sensors such as the mass air flow sensor 95, the intake manifold pressure sensor 97, the coolant temperature sensor 98, and an engine speed sensor 130. For example, the engine speed sensor 130 may sense crank position, providing input on the changing positions from which speed of the engine 14, and particularly the angular speed of the crankshaft, may be determined. In some embodiments, the engine speed sensor 130 may be configured to deliver a rotational speed signal for the speed of the engine 14 such as in revolutions-per-minute. The other sensors 38 may include any number of sensors of the vehicle 10 and include the sensor 80 for sensing an engine on request/state. In embodiments, the sensor may be an ignition switch or another type of device for detecting the engine on request/state. The other sensors 38 include a transmission shift sensor 79. The transmission shift sensor may sense a position of an element of the transmission 16 or of its shift linkage to indicate whether the transmission 16 is in one of various states such as neutral, drive, low, reverse or park.

In the current embodiment, the actuators may include a number of responsive devices associated with controlling operation of the powertrain system 12 and/or the vehicle 10. These actuators may include the intake throttle 96, the fuel injectors 106-113, the spark plugs 118, the fuel pump 105, one or more clutches 120 of the transmission 16. The actuators may include any number of additional devices such as variable valve actuators and others.

In the depicted embodiment, the controller 30 includes the processor 42 and the memory 44 and is coupled with the storage device 50. The controller 30 commands an amount of fuel to be delivered to each cylinder 81-88 through the fuel system 100. A fuel-to-air ratio is the mass of fuel being delivered to the engine 14 over the mass of air being delivered to the engine 14. The amount of fuel commanded, generally correlates to the amount needed for stoichiometric operating conditions given the current operating state of the engine 14. Stoichiometric operation supplies the precise amount of air needed to result in complete burning of the fuel delivered to the cylinders 81-88 for converting all of the delivered fuel to carbon dioxide and water. Accordingly, a ratio of fuel-to-air that provides the right amount of air to completely burn the delivered fuel, is referred to as stoichiometric.

The powertrain system 12, the control system 18, the intake system 22 and the exhaust system 24 effect processing of multiple working fluids to accomplish desired results. For example, intake air and fuel are processed through the engine 14 with an air/fuel ratio delivered to the cylinders in closed-loop control, using inputs from the various sensors including those in the exhaust system 24 to make corrections for efficient operation and air/fuel consumption. In addition, the exhaust gas from the engine 14 is efficiently processed through the exhaust system 24 with control to accelerate heat up from a cold start to quickly reach effective reaction rates in the aftertreatment device 70.

Figure 3:
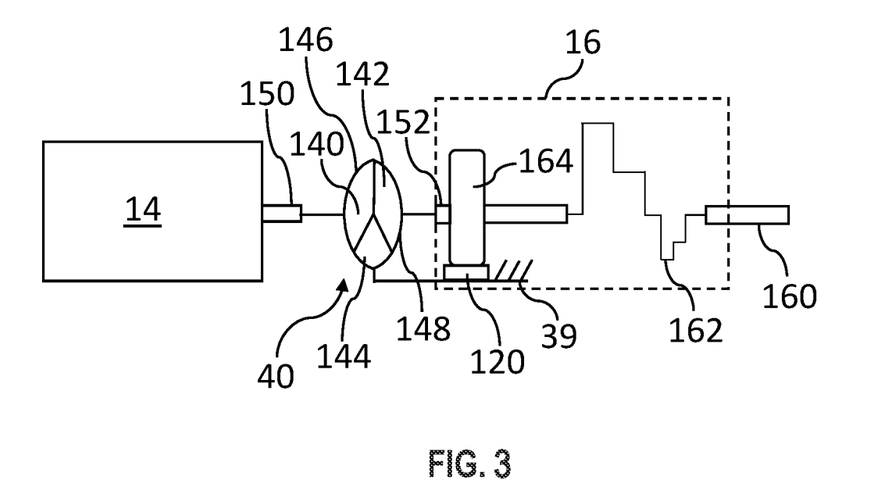
FIG. 3 is a schematic illustration of the torque converter area of the powertrain system of FIG. 2, in accordance with various embodiments.

The area of the torque converter 40 is shown schematically in FIG. 3, to which reference is directed. The torque converter 40 includes vanes sections including an impeller 140 and a turbine 142 and includes a stator 144. The impeller 140 and the turbine 142 each include a number of vanes and a respective housing section 146, 148 that mate together to contain fluid. The impeller 140 operates to pump fluid and the turbine 142 operates to extract energy from the pumped fluid. The stator 144 is disposed between the impeller 140 and the turbine 142 and redirects pumped fluid helping in torque multiplication.

The impeller 140 of the torque converter 40 is coupled an output element 150 of the engine 14 by one or more torque transfer elements including the housing section 146. The turbine 142 is coupled with an input shaft 152 of the transmission 16 through one or more torque transfer elements including the housing section 148. The stator 144 of the torque converter 40 is grounded, directly or indirectly, such as to the case 39 of the transmission 16. In some embodiments, the ground may be through a clutch (not shown), that may operate to selectively allow or prevent rotation of the stator 144 for certain operating conditions. The stator 144 may also include a number of vanes that redirect fluid to harvest kinetic energy enabling the torque converter 40 to multiply torque.

The input shaft 152 of the transmission 16 is coupled with an output shaft 160 through a path that may include a variable series of torque transfer elements 162, that may include any combination of shafts, gears, clutches, plates, frames, or other members to provide various gear ratios. The clutch 120 is disposed between the input shaft 152 and the case 39 through a path that may be direct, or as in this embodiment through a torque transfer element 164, which may be a gear, plate, frame, or other element. For purposes of this disclosure, the clutch 120 is any device that is selectively operated to alternately lock and unlock the input shaft 152 and/or the turbine 142. For example, the clutch 120 may be a clutch, brake, arm, stop or other device to prevent the turbine 142 from rotating. In embodiments, the clutch 120 may be referred to generally as a lock. The clutch 120 is coupled with the controller 30 and may be activated to lock the input shaft 152 to the case 39 to selectively prevent rotation of the turbine 142. Preventing rotation of the turbine 142 with the impeller rotating and pumping fluid under operation of the engine 14 creates a load on the engine 14 causing it to work harder and to deliver more heat into the exhaust system 24.

Figure 4:
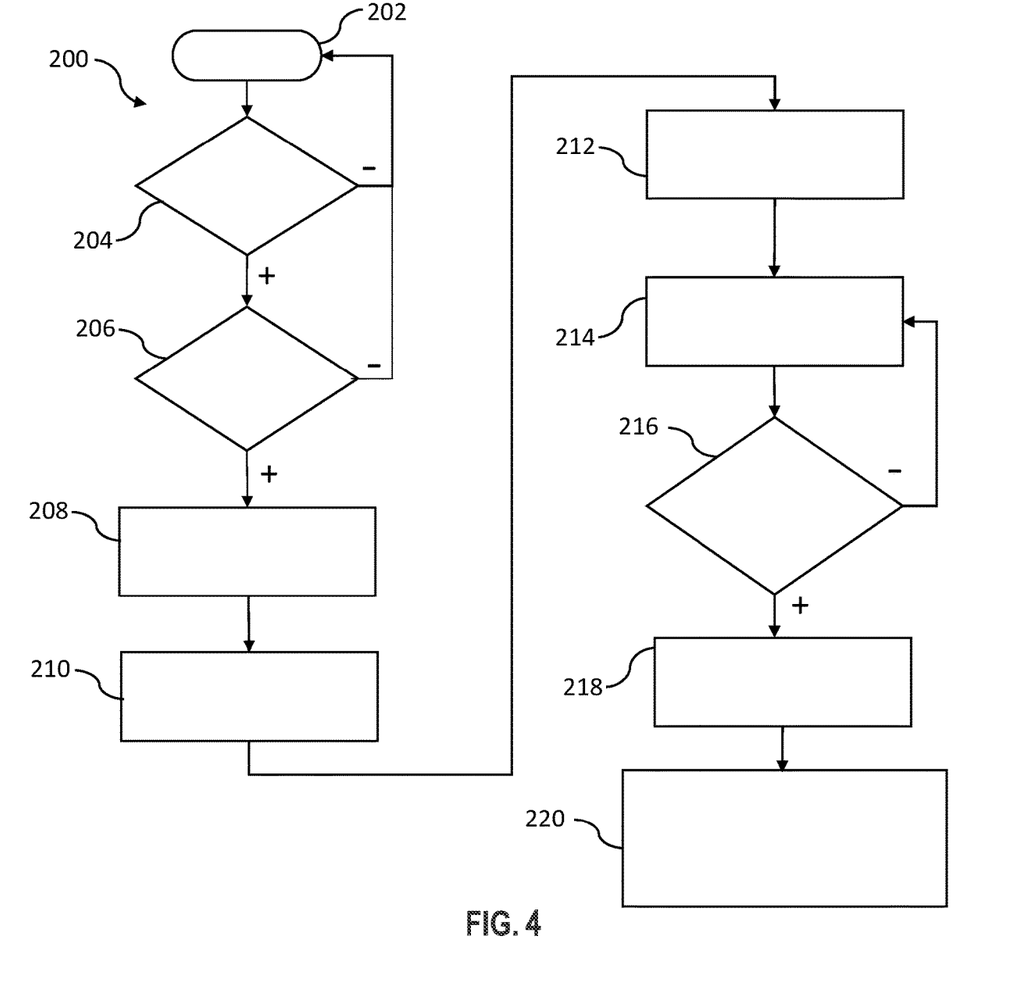
FIG. 4 is a flowchart of a process for implementing the cold start system with transmission lock for the apparatus of FIGS. 1-3, in accordance with various embodiments.

Referring to FIG. 4 along with FIGS. 1-3, a method 200 for control of the powertrain system 12 to quickly reach effective temperatures in the aftertreatment device 70 is depicted. As will be appreciated in light of the disclosure, the order of operation within the method 200 is not limited to the sequential execution as illustrated in FIG. 4 but may be performed in one or more varying orders as applicable and in accordance with the present disclosure.

The method 200 starts 202 and may be scheduled to run based on one or more predetermined events. In the current embodiment, the method 200 starts 202 at wakeup of the controller 30 triggered by the sensor 80. For example, upon initiation of operation of the vehicle 10 by an ignition switch, remote fob, by a driver door open, or other device represented generally by the sensor 80, the controller awakens and the method 200 starts 202. The method 200 includes a determination 204, by the controller 30, as to whether light-off is needed. For example, the processor 42 may reference a threshold temperature value from the stored values 56 in the memory 44. The threshold temperature is based on the nature of the catalyst in the aftertreatment device 70 and its characteristic light-off temperature. In examples, the threshold temperature may be, for example, 250-350 degrees Celsius, but may be different based on the catalyst 76, 78. The threshold temperature value may be compared to a sensed temperature, such as received from the exhaust gas temperature sensor 128. In other embodiments, a cold condition may be discerned using a different sensor, such as the coolant temperature sensor 98. For example, when the engine 14 has not been recently operated and the coolant temperature is below a threshold, it may be determined 204 that the catalyst is in need of being warmed to its light-off temperature. In any case, when the sensed temperature is higher than the threshold temperature, the determination 204 is negative and the method 200 may return to start 202. In embodiments, when the determination 204 is negative, the method 200 may end. In embodiments, the method 200 may end when the engine 14 is started and running.

When the determination 204 is positive, meaning the sensed temperature is lower than the threshold temperature, light-off is needed and the method 200 proceeds to determine 206 whether the transmission 16 is in park or neutral as opposed to a gear such as drive or reverse. For example, the controller 30, such as via the processor 42 may evaluate the signal from the transmission shift sensor 79 to determine 206 whether the transmission 16 is in a park or neutral state. When the transmission 16 is in neither one of park or neutral, the determination 206 is negative and the method 200 may return to start 202. In embodiments, when the determination 204 is negative, the method 200 may end. In embodiments, the method 200 may end when the engine 14 is started.

When the determination 206 is positive, meaning the transmission 16 is in one of park or neutral, the method 200 proceeds to enable 208 lock of the transmission 16. While lock is enabled 208, the actual locking of the transmission 16 does not occur at this step of the method 200. The method 200 proceeds to start 210 the engine 14. For example, the sensor 80 may provide an indication to start the engine 14 when embodied as an ignition switch or remote fob. Following engine start 210, the processor 42 operates the clutch 120 to lock 212 the transmission input shaft 152. In effect, the turbine 142 is locked 212 to prevent its rotation. In other embodiments, the clutch 120 may be any device that locks the input shaft 152 and/or the turbine 142 from rotating. Locking 212 after starting 210 the engine 14 provides for starting the engine 14 without the added load that locking 212 effects.

Following the lock 212, the method 200 proceeds to increase heating rate 214 of the catalyst of the aftertreatment device 70 by varying one or more operational parameters of the engine 14. For example, the processor 42 may vary operation of the engine 14 through one or more actuators to generate additional heat supplied to the exhaust system 24. In embodiments, the processor 42 operates the ignition system 20 to delay (retard) the timing of the spark generated by the spark plugs 118. Delaying the timing of the spark relative to the position of the pistons in the cylinders 81-88 delays the start of combustion reducing efficiency of the engine 14 and producing more heat than the normal timing of spark. The added heat from spark delay is in addition to the added heat from lock 212 of the transmission 16. In other embodiments, other operational parameters of the engine 14 may be varied to increase heat generation in addition to, or in place of, spark delay. For example, higher idle speed, variable valve timing, air/fuel ratio adjustments, or other techniques may be employed.

With an increased heating rate 214 of the aftertreatment device 70 in effect, the method 200 proceeds to determine 216, whether the catalyst has reached its light-off temperature or the transmission 16 is shifted from park/neutral. For example, the processor 42 may evaluate the signals from the transmission shift sensor 79 and the exhaust gas temperature sensor 128. When the transmission shift sensor 79 indicates the transmission is still in one of park or neutral and the exhaust gas temperature sensor 128 indicates the catalyst is still below the threshold light-off temperature, the determination is negative, and the method returns to increased heating rate 214. The determination 216 is positive when either the transmission 16 is shifted from park/neutral and for example is in drive or reverse, or the threshold temperature is reached or exceeded.

When the determination 216 is positive because the transmission 16 is shifted from park/neutral, the transmission 16 is unlocked 218 and the method 200 continues to end 220 when the catalyst reaches the threshold temperature. This means that the added load due to the lock 212 of the transmission is replaced with the load of being in drive or reverse but accelerated heating is continued by the varying one or more operational parameters of the engine 14/spark delay until the threshold temperature is reached, at which point the method 200 ends 220.

When the determination 216 is positive because the catalyst has reached the threshold temperature, such as may be indicated by the exhaust gas temperature sensor 128, the method 200 proceeds to unlock 218 the transmission 16 and end 220. Unlocking 218 and ending 220 means that increased heating of the catalyst is no longer needed and the engine 14 is operated according to its normal routine.

Accordingly, engine systems reduce tailpipe gaseous (hydrocarbon and/or carbon monoxide) emissions and/or oxide emissions during cold start operating conditions. Engine load is increased at startup to heat the catalysts to effective temperatures more rapidly. The increased load is effected by grounding the transmission input to the case so that the torque converter creates resistance on the engine and may be mechanized using an existing clutch of the transmission without new hardware.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine system, comprising:
   an engine configured to consume fuel and air to generate an exhaust gas stream;
   an exhaust system configured to channel the exhaust gas stream from the engine to a tailpipe;
   an aftertreatment system in the exhaust system, the aftertreatment system including a catalyst;
   a transmission system coupled with the engine, the transmission system including a transmission and a torque converter coupled with the transmission through a torque transfer element;
   element to increase a load on the engine by the torque converter; and
   a controller configured to determine, prior to starting the engine, whether heating of the catalyst is needed.

2. The engine system of claim 1, wherein the controller is configured to:
   determine whether the transmission is in one of a park state and a neutral state; and
   enable the lock only when the transmission is in one of the park state and the neutral state.

3. The engine system of claim 1, wherein the controller is configured to:
   determine whether the aftertreatment system is below a threshold temperature; and
   operate the lock to prevent rotation of at least one element of the transmission system when the aftertreatment system is below the threshold temperature.

4. The engine system of claim 1, comprising an ignition system of the engine, and wherein the controller is configured to:
   determine whether the aftertreatment system is below a threshold temperature;
   operate the lock to prevent rotation of at least one element of the transmission system when the aftertreatment system is below the threshold temperature; and
   delay a timing of the ignition system after the lock is operated to increase a rate of heating of the aftertreatment system.

5. The engine system of claim 1, wherein the controller is configured to:
   wake up in response to a signal from a sensor;
   start the engine; and
   operate the lock following the start of the engine.

6. The engine system of claim 1, wherein the controller is configured to:
   operate the lock to prevent rotation of at least one element of the transmission system when the aftertreatment system is below a threshold temperature; and
   operate the lock to allow rotation of the at least one element when the transmission is shifted so as to not be in park or neutral, including when the aftertreatment system is below the threshold temperature.

7. The engine system of claim 1, wherein:
   the transmission system includes a case,
   the torque converter includes an impeller coupled with the engine and a turbine coupled with the transmission through a shaft, and
   the lock comprises a clutch of the transmission system and is configured to ground the shaft to the case.

8. The engine system of claim 1, wherein the controller is configured to control, based on a temperature of the aftertreatment system, operation of the lock to selectively increase the load on the engine from the torque converter.

9. The engine system of claim 1, wherein the controller is configured to control both the lock and operational parameters of the engine to selectively increase a rate of heating of the catalyst of the aftertreatment system during a cold start.

10. The engine system of claim 1, wherein the controller is configured to:
    determine whether a temperature of the catalyst is below a threshold temperature;
    determine whether the transmission is in one of a park state and a neutral state;
    operate the lock to lock the transmission system when the catalyst is below the threshold temperature and the transmission is in one of the park state and the neutral state;
    determine whether the catalyst has exceeded the threshold temperature and whether the transmission is shifted from the one of the park state and the neutral state; and
    operate the lock to unlock the transmission system when either the catalyst has exceeded the threshold temperature, or the transmission is shifted from the one of the park state and the neutral state.

11. A method of operating an engine system, the method comprising:
    operating an engine configured to consume fuel and air to generate an exhaust gas stream;
    channeling the exhaust gas stream through an exhaust system from the engine to a tailpipe;
    positioning an aftertreatment system in the exhaust system;
    including a catalyst in the aftertreatment system;
    coupling a transmission system with the engine, the transmission system including a transmission and a torque converter coupled with the transmission through a torque transfer element;
    waking a controller in response to a signal from a sensor;
    starting the engine by the controller;
    operating, by the controller, a lock in the transmission system following the starting of the engine; and
    selectively preventing, by the lock in the transmission system, rotation of the torque transfer element to increase a load on the engine.

12. The method of claim 11, comprising:
    determining, by the controller, whether the transmission is in one of a park state and a neutral state; and
    enabling, by the controller, the lock only when the transmission is in one of the park state and the neutral state.

13. The method of claim 11, comprising:
    determining, by the controller, whether the aftertreatment system is below a threshold temperature; and
    operating, by the controller, the lock to prevent rotation of at least one element of the transmission system when the aftertreatment system is below the threshold temperature.

14. The method of claim 11, comprising:
    determining, by the controller, whether the aftertreatment system is below a threshold temperature; and
    operating, by the controller, the lock to prevent rotation of at least one element of the transmission system when the aftertreatment system is below the threshold temperature; and
    delaying, by the controller, a timing of an ignition system of the engine after the lock is operated to increase a rate of heating of the aftertreatment system.

15. The method of claim 11, wherein the controller is configured to enable, prior to the starting the engine, the lock in the transmission system.

16. The method of claim 11, comprising:
operating, the controller, the lock to prevent rotation of at least one element of the transmission system when the aftertreatment system is below a threshold temperature; and
operating, by the controller, the lock to allow rotation of the at least one element when the transmission is shifted so as to not be in park or neutral, including when the aftertreatment system is below the threshold temperature.

17. The method of claim 11, comprising:
the transmission system includes a case,
coupling an impeller of the torque converter with the engine;
coupling a turbine of the torque converter with the transmission through a shaft, and
selectively grounding the shaft to the case by the lock, which comprises a clutch of the transmission system.

18. The method of claim 11, comprising controlling, by the controller and based on a temperature of the aftertreatment system, operation of the lock to selectively increase the load on the engine from the torque converter.

19. The method of claim 11, comprising controlling, by the controller, both the lock and operational parameters of the engine to selectively increase a rate of heating of the catalyst of the aftertreatment system during a cold start.

20. A vehicle comprising:
engine system with an engine configured to consume fuel and air to generate an exhaust gas stream;
an exhaust system configured to channel the exhaust gas stream from the engine to a tailpipe;
an aftertreatment system in the exhaust system, the aftertreatment system including a catalyst;
a transmission system coupled with the engine, the transmission system including a transmission and a torque converter coupled with the transmission through a shaft;
a lock in the transmission system configured to selectively prevent rotation of the shaft to increase a load on the engine by the torque converter; and
a controller configured to:
determine, prior to starting the engine, whether heating of the catalyst is needed, including by determining whether a temperature of the catalyst is below a threshold temperature;
determine whether the transmission is in one of a park state and a neutral state;
operate the lock to lock the transmission system when the catalyst is below the threshold temperature and the transmission is in one of the park state and the neutral state;
determine whether the catalyst has exceeded the threshold temperature and whether the transmission is shifted from the one of the park state and the neutral state; and
operate the lock to unlock the transmission system when either the catalyst has exceeded the threshold temperature, or the transmission is shifted from the one of the park state and the neutral state.

* * * * *